(12) United States Patent
Chang et al.

(10) Patent No.: US 8,109,650 B2
(45) Date of Patent: Feb. 7, 2012

(54) ILLUMINANT SYSTEM USING HIGH COLOR TEMPERATURE LIGHT EMITTING DIODE AND MANUFACTURE METHOD THEREOF

(75) Inventors: Ya-Hsien Chang, Hsin-Chu (TW); Hsin-Wu Lin, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 419 days.

(21) Appl. No.: 12/469,340

(22) Filed: May 20, 2009

(65) Prior Publication Data
US 2009/0290339 A1    Nov. 26, 2009

(30) Foreign Application Priority Data

May 21, 2008    (TW) ................................ 97118682 A

(51) Int. Cl.
*F21V 9/00* (2006.01)
(52) U.S. Cl. ............ 362/231; 313/498; 313/500; 445/3; 362/97.3; 362/249.02; 362/249.05; 362/249.06
(58) Field of Classification Search .................... 362/27, 362/97.1–97.3, 231, 249.02, 249.05, 249.06, 362/612, 613, 800; 313/498, 500; 445/3
See application file for complete search history.

(56) References Cited

U.S. PATENT DOCUMENTS

| 7,404,652 | B2 * | 7/2008 | Ng et al. ........................ 362/231 |
| 7,654,685 | B2 * | 2/2010 | Wan et al. ...................... 362/231 |
| 2006/0249739 | A1 | 11/2006 | Wang et al. |

FOREIGN PATENT DOCUMENTS

CN    1949507    4/2007

OTHER PUBLICATIONS

Chinese language office action dated Jul. 10, 2009.
English language translation of abstract of CN 1949507.

* cited by examiner

*Primary Examiner* — Stephen F Husar
(74) *Attorney, Agent, or Firm* — Thomas, Kayden, Horstemeyer & Risley, LLP

(57) ABSTRACT

A light emitting diode (LED) illuminant system, a manufacture method thereof, and a backlight module using the same are provided. The LED illuminant system includes a plurality of white light illuminants and at least one green light illuminant mixed in the white light illuminants. A light power ratio of the green light illuminant to the white light illuminants is in between 1/5 to 1/20. The color temperature of the whole illuminant system will be enhanced to a certain extent by mixing the green light illuminant and the white light illuminants. The manufacture method includes the following steps: obtaining a transmission spectrum of the white light illuminants; analyzing the transmission spectrum to determine n supplemental amount of a green light; and disposing at least one green illuminant in accordance with the supplemental amount of the green light.

25 Claims, 11 Drawing Sheets

ILLUMINANT SYSTEM USING HIGH COLOR TEMPERATURE LIGHT EMITTING DIODE AND MANUFACTURE METHOD THEREOF

This application claims the priority based on a Taiwanese Patent Application No. 097118682, filed on May 21, 2008, the disclosure of which is incorporated herein by reference in its entirety.

BACKGROUND OF THE INVENTION

1. Field of the Invention

This invention relates to a light emitting diode (LED) illuminant system, a manufacture method thereof, and a backlight module using the same; more particularly, this invention relates to a light emitting diode illuminant system having high color temperature and a manufacture method thereof.

2. Description of the Prior Art

Display panels and panel display devices using the display panels have become the mainstream of various display devices. For example, various panel displays, home flat televisions, panel monitors of personal computers and laptop computers, and display screens of mobile phones and cameras are products widely using display panels. Particularly, the market demand for liquid crystal display devices largely increases in recent years. In order to meet the function and appearance requirements of liquid crystal displays, the design of backlight modules used in liquid crystal display devices is diverse.

In order to meet the requirements of small size, light weight, and less power consumption, light emitting diodes have been widely used as light sources of the backlight modules. Among all kinds of light emitting diodes, white light emitting diodes (white LEDs) are more often used as the backlight module light source. The white LEDs available in market usually emit white light by exciting white fluorescent powder with a blue light chip. FIG. 1 illustrates a chromaticity distribution diagram of the light emitted from such white LEDs. As illustrated in FIG. 1, the distribution of the light emitted from the white LEDs generally falls between (0.261, 0.222) and (0.268, 0.234) in the CIE chromaticity coordinate. Because the chromaticity range within the white light range is relatively close to the low color temperature area, the white light emitted from the white LEDs has a relative low color temperature.

For a conventional small liquid crystal display, there is no problem of using white lights of low color temperature as the light source of the backlight module. However, for a larger liquid crystal display, particularly for a liquid crystal television panel, due to the high color temperature requirement of the industrial standards, using white lights of low color temperature as the light source of the backlight module is difficult to meet the design standards. For example, the emitted light has to reach (0.2788, 0.292) in the CIE chromaticity coordinate to obtain a color temperature performance of 10,000K. In order to solve the problem, how to increase the color temperature of the light without significantly increasing the cost has become one major issue.

SUMMARY OF THE INVENTION

An object of this invention is to provide a light emitting diode illuminant system and a manufacture method thereof, which is capable of outputting lights of higher color temperature.

Another object of this invention is to provide a light emitting diode illuminant system and a manufacture method thereof, which can output required light performances while controlling the manufacturing cost.

Another object of this invention is to provide a backlight module capable of outputting lights of higher color temperature.

In one embodiment, a LED illuminant system of this invention includes a plurality of white light illuminants and at least one green light illuminant mixed in the white light illuminants. A light power ratio of the green light illuminant to the white light illuminants falls between $\frac{1}{5}$ and $\frac{1}{20}$. By mixing the green light illuminant and the white light illuminants based on the above light power ratio, the color temperature of the overall output light of the light source system can be increased to a certain extent. The green light illuminant and the white light illuminant can be two independent LED elements or different chips or phosphors in a same LED element.

The light emitting diode illuminant system manufacture method of this invention includes the following steps: obtaining a transmission spectrum of a plurality of white light illuminants to obtain a relationship between the intensity and the wavelength of the light, analyzing the transmission spectrum to obtain a supplemental amount of a green light, and disposing at least one green light illuminant based on the supplemental amount of the green light.

DETAILED DESCRIPTION OF THE PREFERRED EMBODIMENT

This invention provides a light emitting diode (LED) illuminant system, a back light module using the light emitting diode illuminant system, and a manufacture method thereof. In a preferred embodiment, the backlight module is provided for liquid crystal display devices. However, in different embodiments, the backlight module can be provided for computer keyboards, mobile phone keypads, billboards, and other devices in need of flat panel light sources. Furthermore, this invention also includes a liquid crystal display device using the illuminant system and the backlight module. In a preferred embodiment, the liquid crystal display device includes a color liquid crystal display device. However, in different embodiments, the liquid crystal device can include a monochromatic liquid crystal display device. Moreover, the liquid crystal display devices herein refer to the display devices using liquid crystal displays, including home liquid crystal display televisions, liquid crystal display monitors of personal computers and laptop computers, and liquid crystal display screens of mobile phones and digital cameras.

The LED illuminant system of this invention mainly includes a plurality of white light illuminants and at least one green light illuminant mixed in the white light illuminants. A ratio of a light power of the green light illuminants to a light power of the white light illuminants is between one fifth (1/5) and one twentieth (1/20). By mixing the green light illuminants and the white light illuminants based on the above light power ratio, the color temperature of output light of the whole illuminant system can be enhanced to a certain extent. For example, the color temperature performance of 10,000K can be obtained at the coordinates (0.2788, 0.292) in CIE chromaticity coordinate. The light power ratio is preferably represented by luminous flux, for example, calculated in a unit of lumen (Lm). However, the light power ratio can be represented by the intensity of light. For example, by comparing the spectrums of the green light illuminants and the white light illuminants, an intensity ratio of the two illuminants can be obtained. Moreover, the light power ratio can also be represented by illuminance, luminance, or by calculating other parameters or indexes related to light power in an absolute or relative manner.

In a preferred embodiment, the light power ratio of the green light illuminants to the white light illuminants can further be controlled around one tenth (1/10) to obtain a better result. In addition, the green light illuminant and the white light illuminant can be two independent LED elements or different chips or phosphors in a same LED element.

Figure 1:
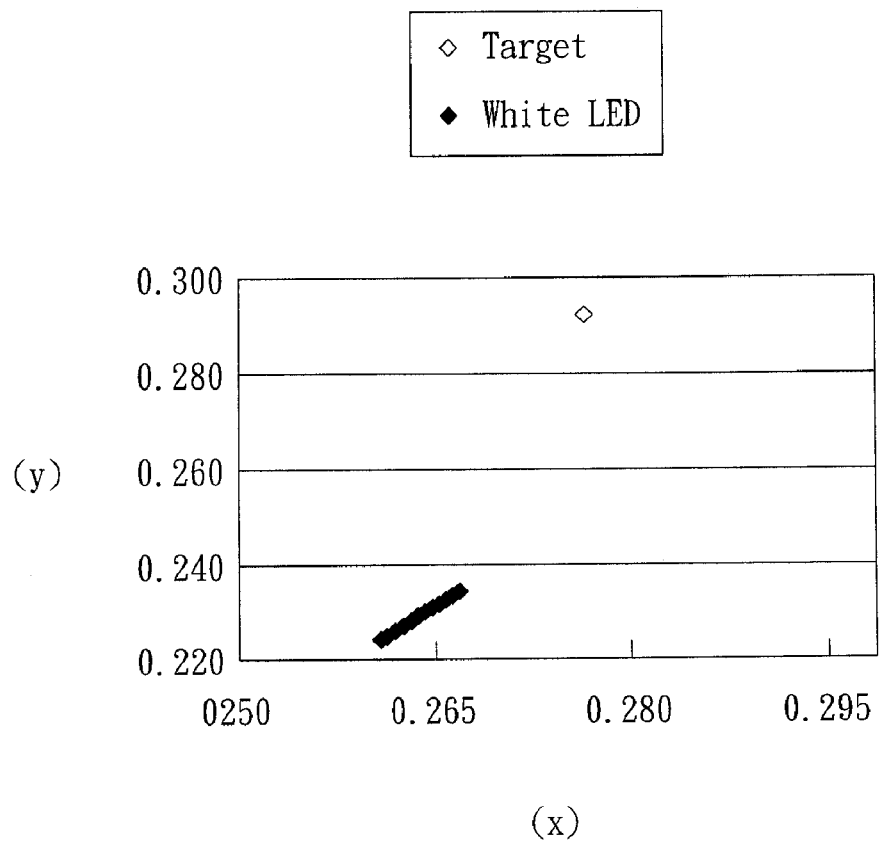
FIG. 1 schematically illustrates a chromaticity diagram distribution of conventional white LEDs.
Figure 2A:
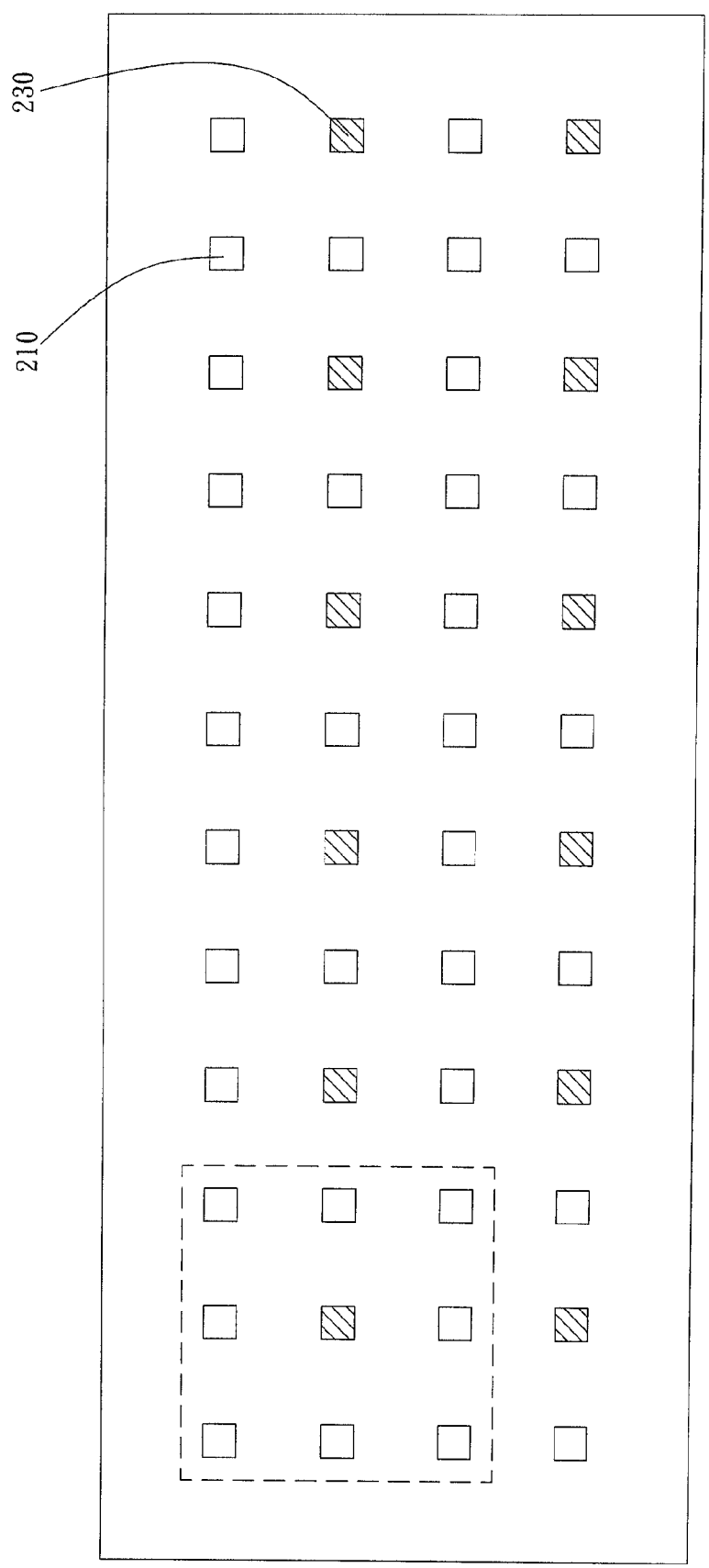
FIG. 2A schematically illustrates a first embodiment of a light emitting diode illuminant system of this invention.
Figure 2B:
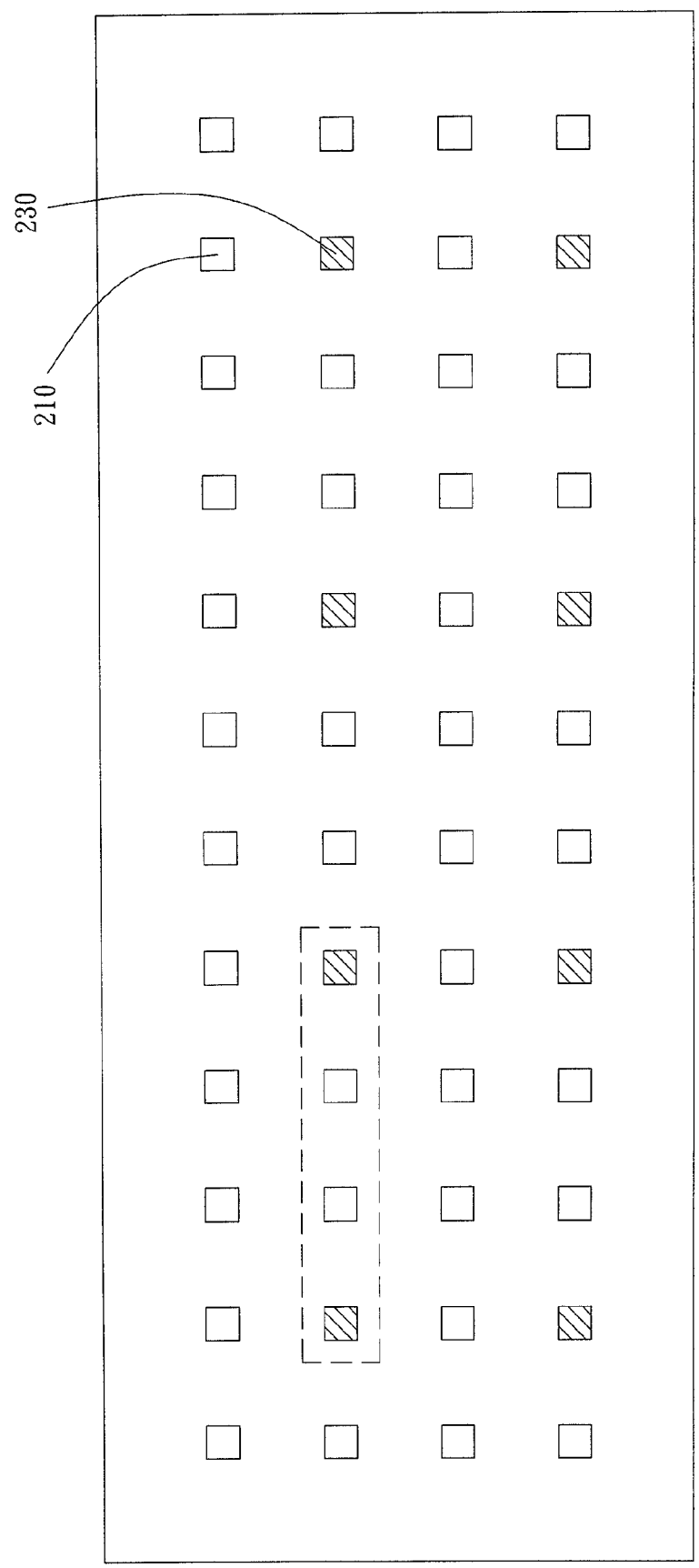
FIG. 2B is a modified embodiment of FIG. 2A.
Figure 2C:
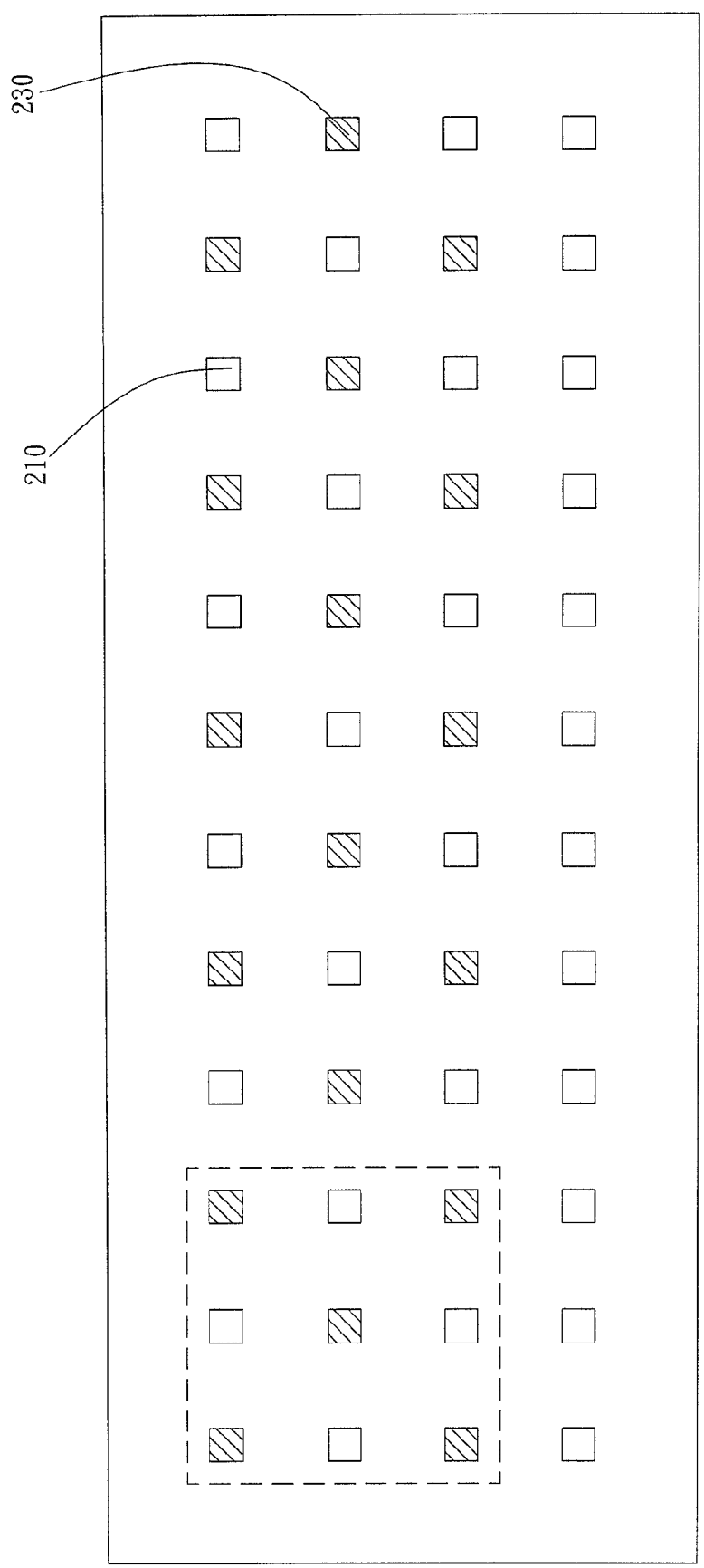
FIG. 2C is a modified embodiment of FIG. 2A.
Figure 2D:
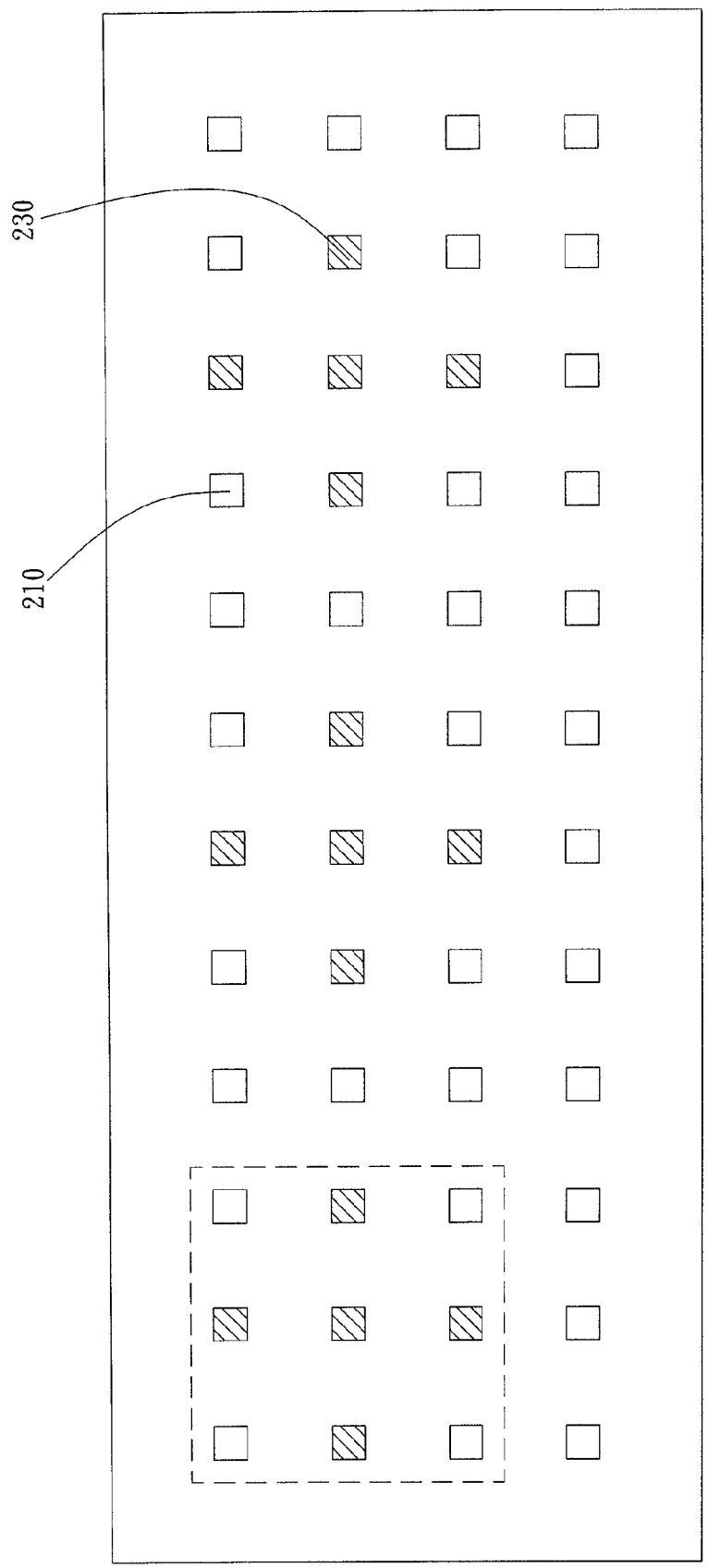
FIG. 2D is a modified embodiment of FIG. 2A.
Figure 2E:
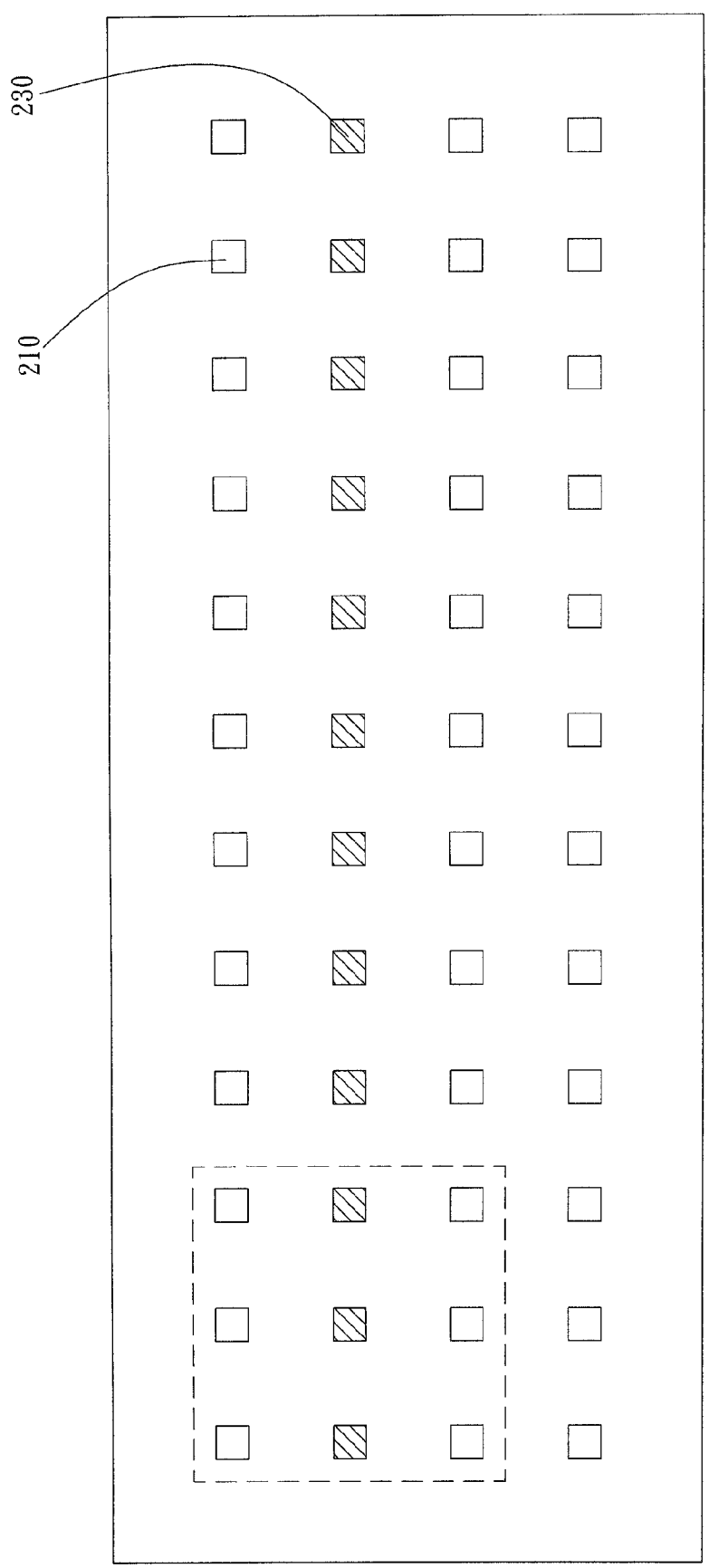
FIG. 2E is a modified embodiment of FIG. 2A.

FIG. 2A illustrates a first embodiment of a LED illuminant system. In this embodiment, the LED illuminant system is an array consisting of a plurality of LEDs. The white light illuminant is a white LED 210, and the green light illuminant is a green LED 230. Each green LED 230 is disposed adjacent to the white LED 210 and surrounded by the white LEDs 210. As illustrated in FIG. 2A, the LEDs in the first row and the third row are all white LEDs 210, while the LEDs in the second row and the fourth row are the white LEDs 210 and the green LEDs 230 arranged alternatively. In other words, each green LED 230 is surrounded by the white LEDs 210. More particularly, for example, in a 3×3 matrix, for the green LED 230 disposed at the second column and the second row (2, 2), the LEDs proximate to the green LED 230 are all white LEDs 210; that is the green LED 230 is only proximate to white LEDs 210. For some white LEDs 210 in the drawing (i.e. in the second row or the fourth row), one green LED 230 is disposed between two white LEDs. However, in another embodiments, the arrangement, order, density, etc of the green LEDs 230 and the white LEDs 210 can be modified in accordance with the light power ratio of the two types of LEDs. For example, in the embodiment illustrated in FIG. 2B, the LEDs of the second and fourth rows can be disposed with two white LEDs 210 between every two adjacent green LEDs 230 to reduce the density and the light power of the green LEDs 230. That is, at least one green LED 230 is disposed between two white LEDs 210. Also, in the embodiment illustrated in FIG. 2C, in a 3×3 matrix, for the green LED 230 disposed at the second column and the second row (2, 2), the LEDs on the upper right corner, upper left corner, lower right corner, and lower left corner of the green LED 230 can be all green LEDs, instead of white LEDs, and the LEDs on top, bottom, right, and left of the green LEDs are all white LEDs 210. In addition, in the embodiment illustrated in FIG. 2D, in a 3×3 matrix, for the green LED 230 disposed at the second column and the second row (2, 2), the LEDs on the upper right corner, upper left corner, lower right corner, or lower left corner of the green LED 230 can be all white LEDs 210. Furthermore, in the embodiment illustrated in FIG. 2E, the green LEDs 230 are disposed on the second row. That is, white LEDs 210 are disposed on at least two sides of the green LED 230.

Figure 3:
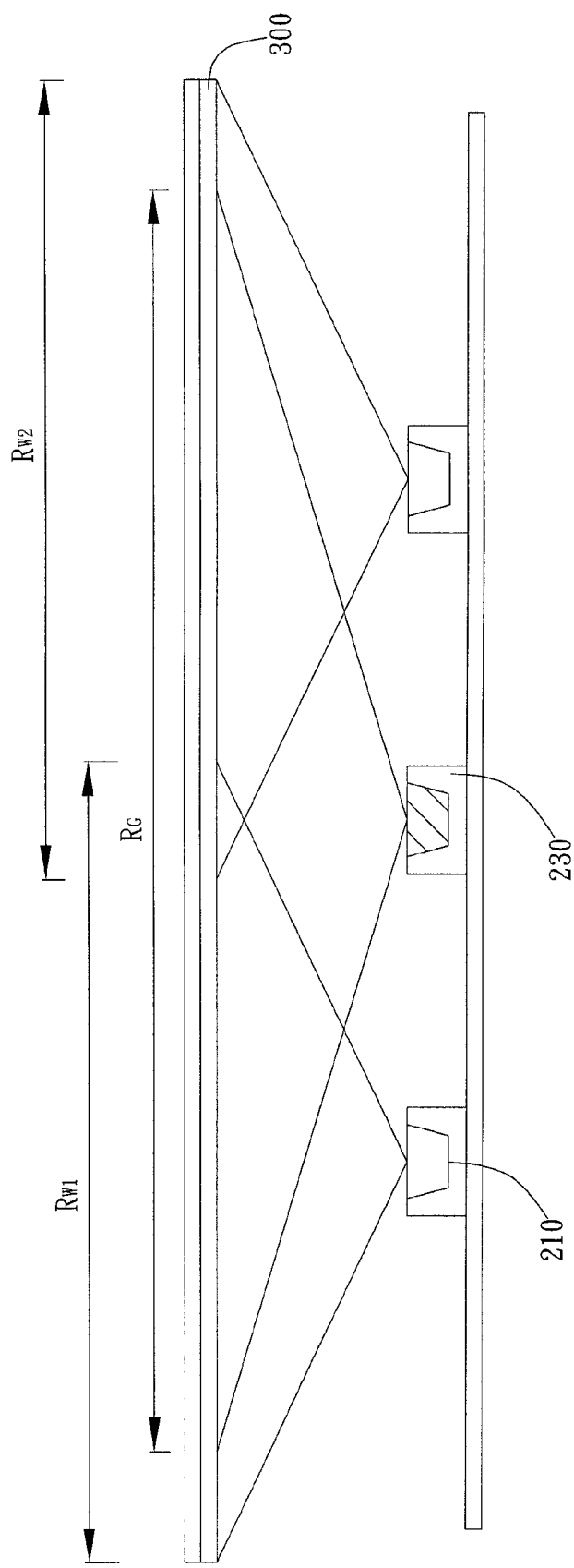
FIG. 3 is a side view of the embodiment of FIG. 2A.
Figure 4:
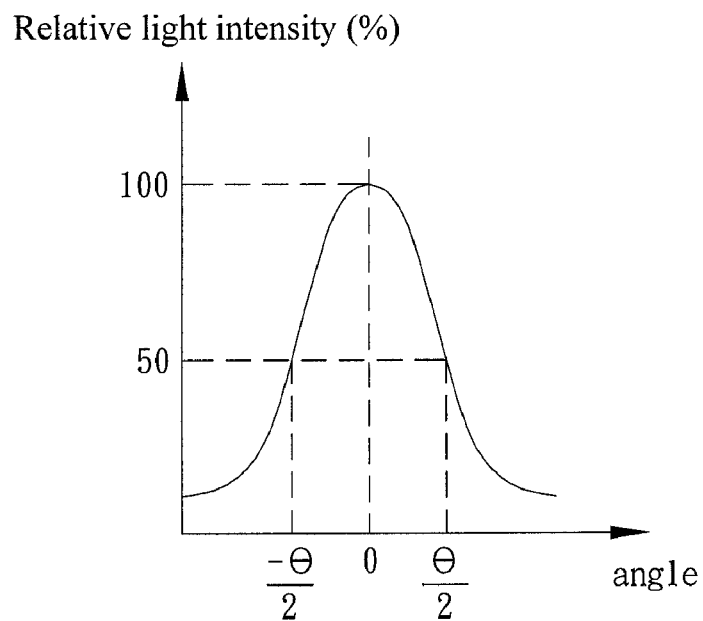
FIG. 4 schematically illustrates the relationship between the output angle and the intensity of the light emitted from the green light emitting diode.

In a preferred embodiment, in order to obtain a better mixing performance of the green LEDs 230 and the white LEDs 210, the illumination area of the green LED 230 overlaps the illumination area of the white LEDs 210. As illustrated in FIG. 3, optical films 300 are disposed on the green LEDs 230 and the white LEDs 210. The illumination area $R_G$ of the green LEDs 230 on the optical films 300 is covered by the illumination areas $R_{W1}$ and $R_{W2}$ of the white LEDs on both sides. Taking the liquid crystal display as an example, if the backlight module is not provided with the optical film 300, the illumination area can be represented by the illumination range of the LEDs on the liquid crystal display panel. Furthermore, in another embodiment, in order to obtain a better mixing performance of the green LEDs 230 and the white LEDs 210, a full width half maximum angle θ of the green LEDs 230 is larger than 120 degrees. As illustrated in FIG. 4, the full width half maximum angle θ refers to the total deflection angle from both sides that can maintain half of the front light intensity. In other words, when the deflection angle is 60 degrees from one side and the light is still half of the intensity of the front light, the full width half maximum angle θ is 120 degrees.

Figure 5:
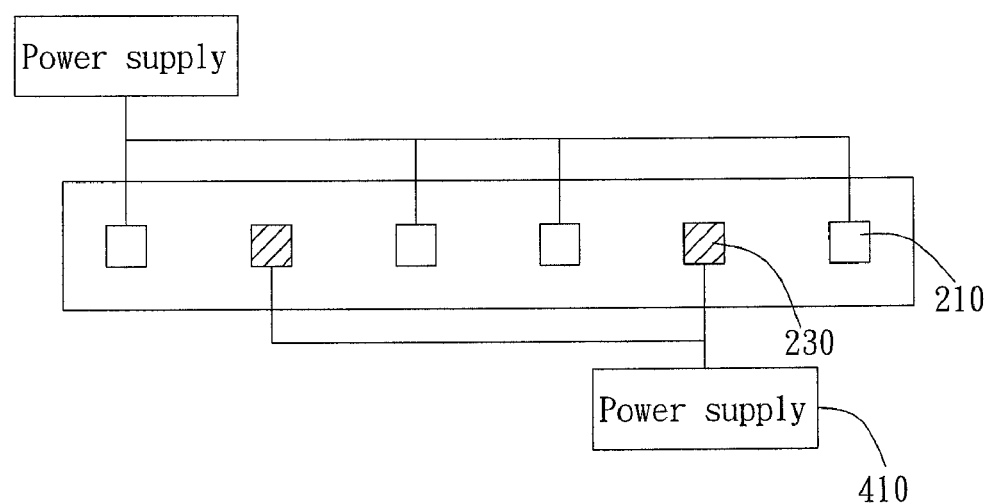
FIG. 5 illustrates another modified embodiment of FIG. 2A.

In a modified embodiment illustrated in FIG. 5, the LED illuminant system can be presented in a form of a LED light bar. In this embodiment, one or more green LEDs 230 can be mixed and disposed among a plurality of white LEDs 210 to enhance the color temperature of the overall output light. As illustrated in FIG. 5, the green LEDs 230 can be distinguished from white LEDs 210 by independent power supply 410 to supply power independently. The light power of the green LEDs 230 can be controlled by adjusting voltage and current of the independent power supply 410. At the same time, the light power ratio of the green LEDs 230 to the white LEDs 210 can be adjusted.

Figure 6A:
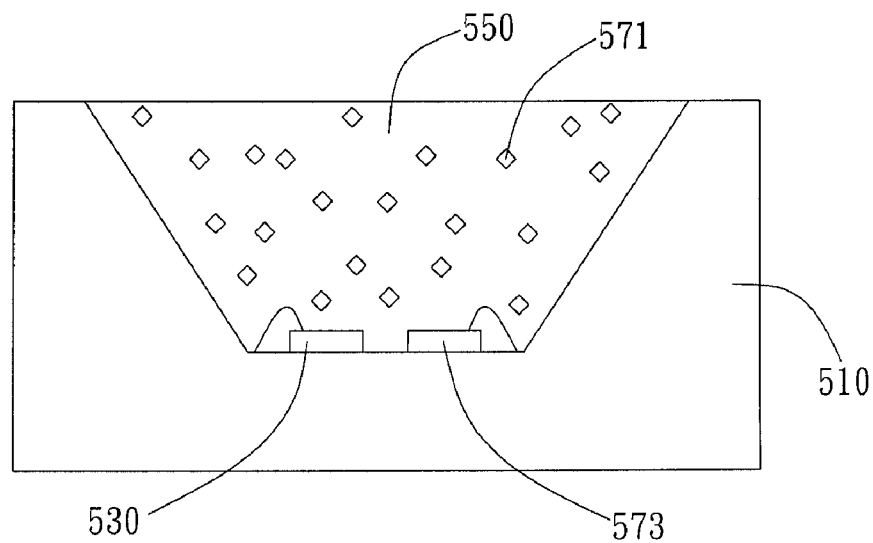
FIG. 6A schematically illustrates a second embodiment of a light emitting diode illuminant system.
Figure 6B:
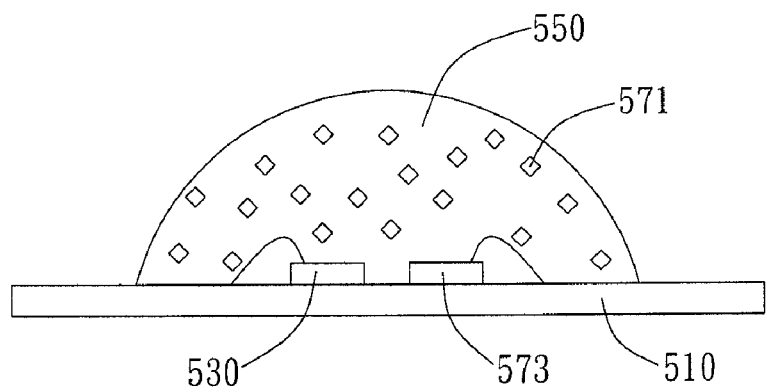
FIG. 6B schematically illustrates an embodiment of using a substrate as a package unit.

FIG. 6A illustrates a second embodiment of a LED illuminant system. In this embodiment, the LED illuminant system is a single LED. The LED includes a package unit 510, a blue light chip 530, and a prism 550. The blue light chip 530 is disposed in the package unit 510. The prism 550 covers the blue light chip 530 and fills in the cavity of the package unit 510. In the embodiment of FIG. 6A, the package unit 510 is a holder with a recessed cavity. Therefore, the prism 550 can be disposed in the cavity. However, in another embodiment, as illustrated in FIG. 6B, the package unit 510 can be a substrate and the prism 550 encapsulates the blue light chip 530 on the package unit 510.

In the embodiment illustrated in FIG. 6A, the yellow phosphors 571 of the LEDs are provided in the prism 550 in a mix distribution manner and serve as the white light illuminant. When the blue light chip 530 illuminates, the light can excite the yellow phosphors 571 to emit white light. Preferably, the yellow phosphors 571 can include YAG phosphors, Silicate phosphors or, other suitable phosphors. The green light chip 573 serves as the green light illuminant. The green light chip 573 and the blue light chip 530 are disposed in the package unit 510 and covered by the prism 550. In one embodiment, the wavelength of the green light chip 573 is between 515 nm and 540 nm. When the blue light chip 530 and the green light chip 573 both illuminate, the blue light chip 530 can excite the yellow phosphors 571 to emit white light, and the green light chip 573 simply emits green light. When the light power ratio of the white light to the green light is appropriately selected, the mixture of the white light and the green light can have an enhanced color temperature effect.

Moreover, as illustrated in FIG. 6A, the green light chip 530 can be distinguished from the blue light chip 530 by independent power supply 410 to supply power independently. When the power supplying to the blue light chip 530 is fixed, the yellow phosphor 571 will be excited to emit the white light of stable power. At this point, the light power of the light emitted from the green light chip 573 can be controlled by adjusting voltage and current of the independent power supply 410. At the same time, the light power ratio of the green light to the white light can be adjusted. However, apart from such a method, the light power ratio of the green light to the white light can be adjusted by other methods. For example, the light power ratio of the green light to the white light can be modified by adjusting the concentration or the percentage of the yellow phosphors 571. Moreover, different features of the above embodiments can be appropriately combined to achieve different effects.

Figure 7:
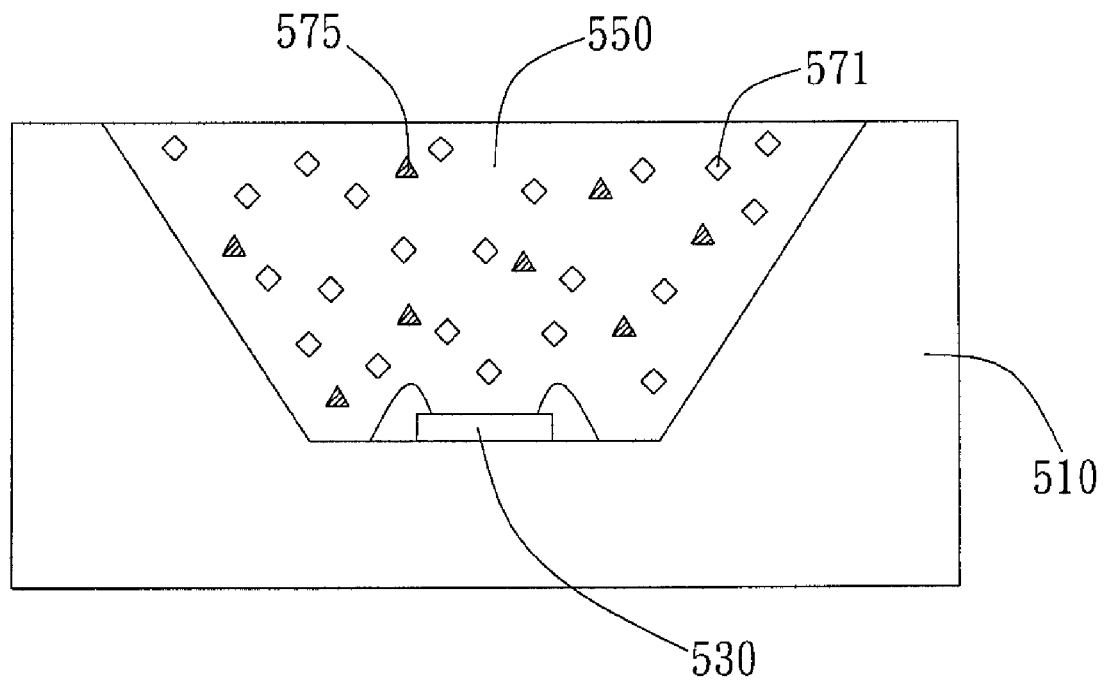
FIG. 7 schematically illustrates a third embodiment of a light emitting diode illuminant system.

FIG. 7 illustrates a third embodiment of a LED illuminant system. In this embodiment, the LED illuminant system is also a single LED. Different from the second embodiment of FIG. 6A, green phosphors 575 instead of the green light chip serve as the green light illuminant. In other words, in this embodiment, the green light phosphors and the white light phosphors respectively serve as the green light illuminant and the white light illuminant and are mixed with each other to be distributed in the prism 550. When the blue light chip 530 emits light, which can excite the yellow phosphors 571 to emit white light and at the same time excite the green phosphors 575 to emit green light. The green light is mixed with the white light to achieve an enhanced color temperature effect.

The green phosphors 575 preferably include silicates, Ba2SiO4, or other suitable phosphors. In order to control the light power ratio of the green light to the white light, the light power of the green light can be changed by adjusting the material, concentration, number, etc of the green phosphors 575. Because the light emitting efficiency of the green phosphors 575 is generally higher, the concentration ratio of the green phosphors 575 to the yellow phosphors 571 is preferably smaller than the light power ratio of the green light and the white light, and preferably smaller than one tenth (1/10). However, when green phosphors 575 of lower light emitting efficiency are employed, the concentration of the green phosphors 575 can be increased. Moreover, features of the above embodiments can be combined as appropriate to offer more diverse choices of design.

Figure 8:
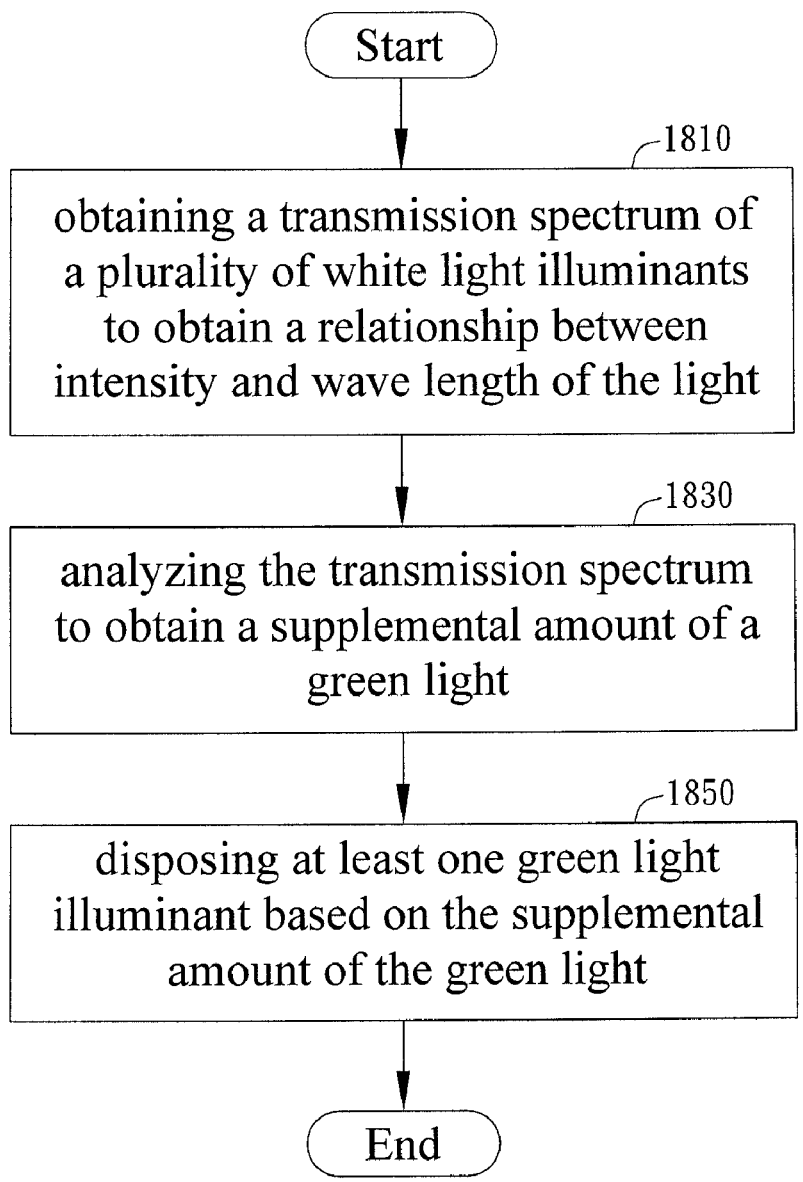
FIG. 8 illustrates a flow chart of a manufacture method of the light emitting diode illuminant system.

FIG. 8 illustrates a flow chart of a manufacture method of the LED illuminant system in accordance with one embodiment of this invention. As illustrated in FIG. 8, step 1810 includes obtaining a transmission spectrum of a plurality of white light illuminants to obtain a relationship between intensity and wavelength of the light. The spectrum is preferably obtained through experiments, calculations, or other methods. As described above, the white light illuminant can be a single white LED, white phosphors in LED, or other white light illuminants applied to LEDs. The transmission spectrum herein preferably refers to a spectrum of the light that is analyzed after passing through a color filter. However, in another embodiment, the transmission spectrum can include a spectrum of the light that is analyzed after passing through the optical film of the backlight module or after passing through the liquid crystal layer.

In a preferred embodiment, when the transmission spectrum represents the spectrum obtained by analyzing the light after passing through the color filter, this step preferably includes the following steps: obtaining an initial spectrum of the white light illuminants, obtaining a filtering spectrum of the color filter, and analyzing the initial spectrum and the filtering spectrum to obtain the transmission spectrum. The initial spectrum and the filtering spectrum can be obtained by experiments, calculations, or other methods. After obtaining the initial spectrum and the filtering spectrum, the light intensities at each wavelength of the two spectrums are compared and further analyzed and calculated. When the intensity change after filtering is subtracted, the transmission spectrum can be obtained.

Step 1830 includes analyzing the transmission spectrum to obtain a supplemental amount of a green light. In the preferred embodiment, the analyzing method includes comparing the transmission spectrums of the white light illuminant and the green light illuminant and analyzing the spectrum shape and intensity distribution of both spectrums. While the analysis is performed, a target spectrum distribution can be predetermined. By adjusting the light power ratio of the green light illuminant to the white light illuminant, the mix of the two spectrums tends to meet the target spectrum distribution. Such a target spectrum distribution is preferably obtained based on a desired enhancement of the color temperature. When the mix of the transmission spectrums of the green light illuminant and the white light illuminant tends to meet the target spectrum, the light power ratio of the green light illuminant to the white light illuminant can be determined and the supplemental amount of the green light can be obtained based on the light power ratio. The light power ratio is preferably between one fifth (1/5) and one twentieth (1/20). The light power ratio of the green light illuminant to the white light illuminant is preferably represented by luminous flux, for example, calculating in a unit of lumen (Lm). However, the light power ratio can be represented by the intensity of light. For example, by comparing the spectrums of the green light illuminant and the white light illuminant, an intensity ratio of the two spectrums can be obtained. Moreover, the light power ratio can also be represented by illuminance, luminance, or by calculating other parameters or indexes related to power in an absolute or relative manner.

In step 1830, the transmission spectrum can be analyzed by other methods. For example, a desired color temperature is firstly predetermined, and then the required supplemental amount of the green light is calculated based on the desired color temperature. Moreover, the light power ratio of the supplemental amount of the green light to the white light illuminant is also controlled between 1/5 and 1/20, and it can be further limited approximately to 1/10 to obtain a better result.

Step 1850 includes disposing at least one green light illuminant based on the supplemental amount of the green light. As mentioned above, the green light illuminant may include green LEDs, green light chips in LEDs, green light phosphors in LEDs, etc. When the green light illuminants are green LEDs, the number of the green LEDs can be determined based on the supplemental amount of the green light, the arrangement of the white light illuminants, etc. Moreover, the power supply parameters of the green LEDs, such as current, voltage, etc, can also be determined based on the supplemental amount of the green light to control the light power of the green LEDs.

In different embodiments, when the green light illuminants are green light chips, step 1850 includes disposing at least one blue light chip and at least one green light chip in a package unit and disposing a prism to cover the blue light chip and the green light chip. Yellow phosphors are distributed in the prism. When the blue light chip emits light, yellow phosphors are excited to emit white light. In this embodiment, the power supply parameters of the green light chips, such as current, voltage, etc, are determined based on the supplemental amount of the green light to control the light power of the green LED.

When the green light illuminant and the white light illuminant are both the phosphors mixed in the prism, the concentration or percentage thereof can be determined based on the supplemental amount of the green light. Because the light emitting efficiency of green phosphors is generally higher, the concentration ratio of the green phosphors to the yellow phosphors is smaller than the light power ratio of the green light to the white light, and preferably smaller than $1/10$. However, when green phosphors of lower light emitting efficiency are employed, the concentration of the green phosphors can be increased.

This invention has been described through the relevant embodiments above; however, the embodiments above are only exemplary. What needs to point out is that the embodiments disclosed are not intended to limit the scope of the present invention. Contrarily, the modifications and the equivalents included in the spirit and scope of the claims are all included in the scope of this invention.

What is claimed is:

1. A light emitting diode illuminant system for a backlight module, comprising:
    a plurality of white light illuminants; and
    at least one green light illuminant mixed in the plurality of white light illuminants, wherein a light power ratio of the green light illuminant to the white light illuminants is between one fifth ($1/5$) and one twentieth ($1/20$).

2. The light emitting diode illuminant system of claim 1, wherein the light power ratio of the at least one green light illuminant to the white light illuminants is one tenth ($1/10$).

3. The light emitting diode illuminant system of claim 1, wherein the plurality of white light illuminants comprise a plurality of white light emitting diodes (LEDs), the at least one green light illuminant comprises a plurality of green LEDs, each green LED is surrounded by the white LEDs, and an illumination area of the green LEDs overlaps an illumination area of the white LEDs.

4. The light emitting diode illuminant system of claim 3, wherein each green LED is not proximate to any green LEDs.

5. The light emitting diode illuminant system of claim 3, wherein each green LED is proximate only to white LEDs.

6. The light emitting diode illuminant system of claim 3, wherein white LEDs are disposed on upper right corner, upper left corner, lower right corner, and lower left corner of each green LED.

7. The light emitting diode illuminant system of claim 3, wherein white LEDs are disposed on at least two sides of each green LED.

8. The light emitting diode illuminant system of claim 3, wherein at least one white LED is disposed between two adjacent green LEDs.

9. The light emitting diode illuminant system of claim 3, wherein at least one green LED is disposed between two adjacent white LEDs.

10. The light emitting diode illuminant system of claim 3, wherein in a 3×3 matrix of the green LEDs and the white LEDs, at least one green LED is disposed at the second column and the second row (2, 2).

11. The light emitting diode illuminant system of claim 3, wherein a full width half maximum angle of the green LED is larger than 120 degrees.

12. The light emitting diode illuminant system of claim 3, further comprising an independent power supply electrically connected to the green LEDs, wherein the independent power supply controls the light power of the green LEDs to adjust the light power ratio of the green LEDs to the white LEDs.

13. The light emitting diode illuminant system of claim 1, further comprising:
    a package unit;
    a blue light chip disposed in the package unit; and
    a prism disposed on the package unit to cover the blue light chip,
    wherein the white light illuminants include a plurality of yellow phosphors mixed and distributed in the prism, and the green light illuminant includes a green light chip disposed in the package unit and covered by the prism.

14. The light emitting diode illuminant system of claim 13, further comprising an independent power supply electrically connected to the green light chip, wherein when the yellow phosphors are excited to generate light, the independent power supply controls the light power of the green light chip to adjust the light power ratio of the green light chip to the white light illuminants.

15. The light emitting diode illuminant system of claim 13, wherein a wavelength of the green light chip is between 515 nm and 540 nm.

16. The light emitting diode illuminant system of claim 1, further comprising:
    a package unit;
    a blue light chip disposed in the package unit; and
    a prism disposed on the package unit to cover the blue light chip;
    wherein the white light illuminants include a plurality of yellow phosphors, the green light illuminant includes a plurality of green phosphors, and the yellow phosphors and the green phosphors are mixed and distributed in the prism.

17. The light emitting diode illuminant system of claim 16, wherein a concentration of the green phosphors is less than $1/10$ of a concentration of the yellow phosphors.

18. A manufacture method of a backlight module using a light emitting diode illuminant system, comprising following steps:
    obtaining a transmission spectrum of a plurality of white light illuminants;
    analyzing the transmission spectrum to determine a supplemental amount of a green light, wherein a light power ratio of the supplemental amount of the green light to the white light illuminants is between $1/5$ and $1/20$; and
    disposing at least one green light illuminant based on the supplemental amount of the green light.

19. The manufacture method of claim 18, wherein the step of obtaining the transmission spectrum comprises:
    obtaining an initial spectrum of the white light illuminants;
    obtaining a filtering spectrum of a color filter; and
    analyzing the initial spectrum and the filtering spectrum to obtain the transmission spectrum.

20. The manufacture method of claim 18, wherein the light power ratio of the supplemental amount of the green light to the white light illuminants is $1/10$.

21. The manufacture method of claim 18, wherein the plurality of white light illuminants include a plurality of white LEDs, the at least one green light illuminant includes a plurality of green LEDs, and the step of disposing the at least one green light illuminant comprises determining the number of the green LEDs based on the supplemental amount of the green light.

22. The manufacture method of claim 18, wherein the plurality of white light illuminants include a plurality of white LEDs, the at least one green light illuminant includes a plurality of green LEDs, and the step of disposing the at least one green light illuminant comprises determining power parameters of the green LEDs based on the supplemental amount of the green light.

23. The manufacture method of claim 18, wherein the step of disposing the at least one green light illuminant comprises:
   disposing a blue light chip in a package unit;
   disposing the at least one green light illuminant including a green light chip in the package unit;
   determining power parameters based on the supplemental amount of the green light; and
   disposing a prism on the package unit to cover the blue light chip, wherein the white light illuminants include a plurality of yellow phosphors are mixed and distributed in the prism.

24. The manufacture method of claim 18, wherein the step of disposing the at least one green light illuminant comprises:
   disposing a blue light chip in a package unit;
   determining relative concentrations of the at least one green light illuminant and the white light illuminants based on the supplemental amount of the green light, wherein the white light illuminants include a plurality of yellow phosphors, the at least one green light illuminant includes a plurality of green phosphors; and
   disposing a prism on the package unit to cover the blue light chip, wherein the yellow phosphors and the green phosphors are mixed and distributed in the prism.

25. The manufacture method of claim 18, wherein the step of disposing the at least one green light illuminant comprises:
   disposing a blue light chip in a package unit;
   adjusting a transmission spectrum of the green light illuminant based on the supplemental amount of the green light, wherein the green light illuminant includes a plurality of green phosphors; and
   disposing a prism on the package unit to cover the blue light chip, wherein the white light illuminants include a plurality of yellow phosphors, and the yellow phosphors and the green phosphors are mixed and distributed in the prism.

* * * * *